Figure 1:
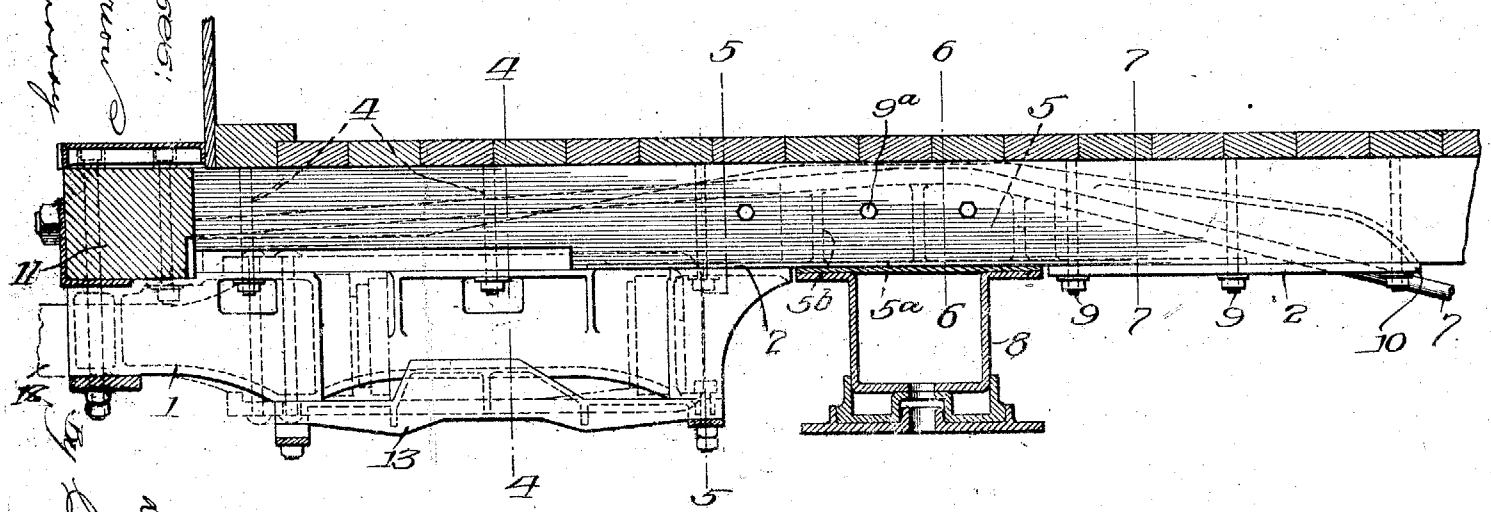

D. F. CRAWFORD.

DRAFT GEAR MECHANISM.

APPLICATION FILED NOV. 30, 1914.

Reissued Mar. 30, 1915.

13,894.

3 SHEETS—SHEET 1.

Witnesses:
Geo. C. Marion
L. F. Murray

Inventor.
David F. Crawford
By C. C. Cuthbertson
Atty.

D. F. CRAWFORD.

DRAFT GEAR MECHANISM.

APPLICATION FILED NOV. 30, 1914.

Reissued Mar. 30, 1915.

13,894.

3 SHEETS—SHEET 2.

Witnesses:
F. C. Perkins
C. F. Mooney

Inventor:
David F. Crawford
by C. C. Lutherman
Atty.

D. F. CRAWFORD.
DRAFT GEAR MECHANISM.
APPLICATION FILED NOV. 30, 1914.
Reissued Mar. 30, 1915.
13,894.
3 SHEETS—SHEET 3.
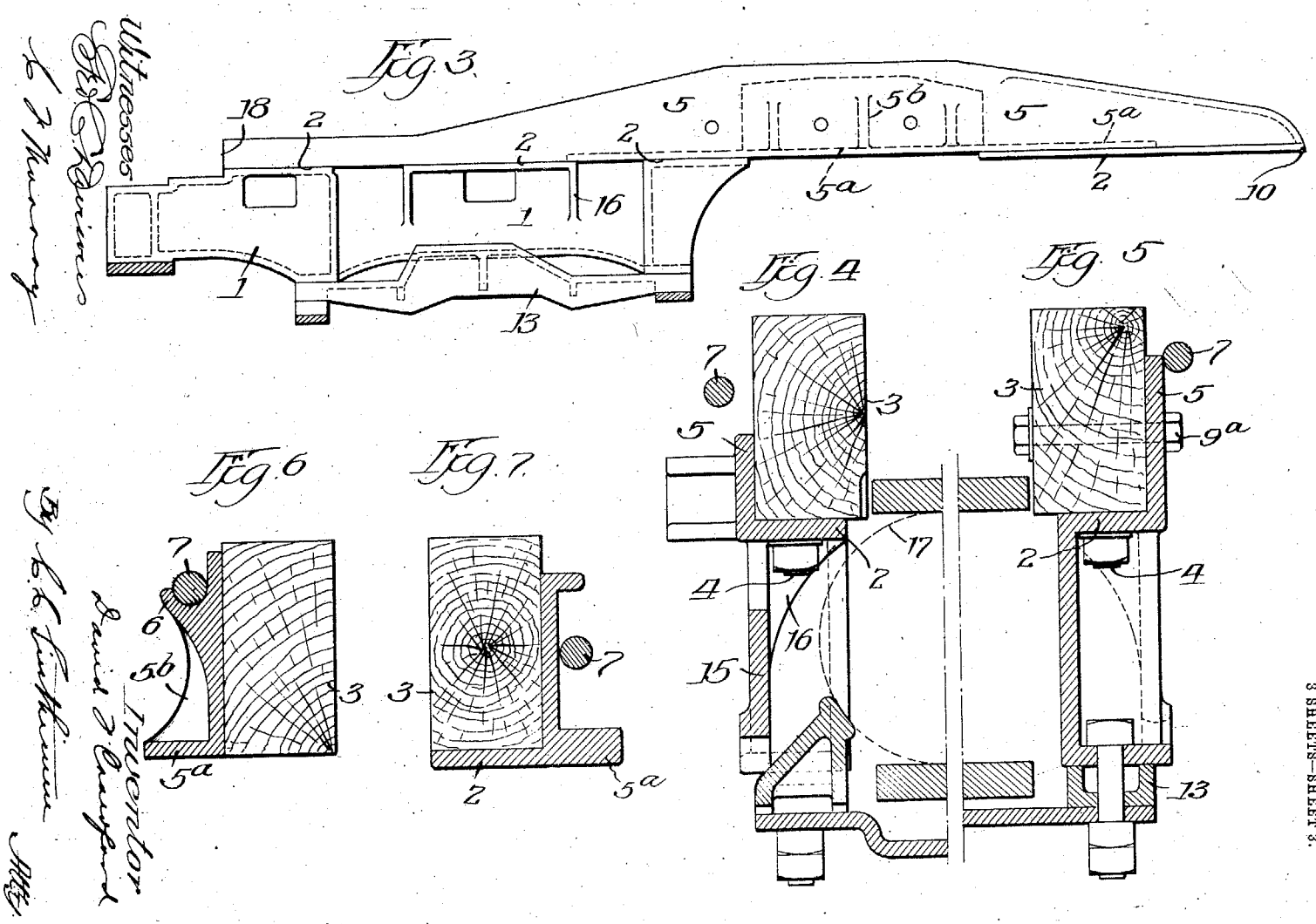

UNITED STATES PATENT OFFICE.

DAVID F. CRAWFORD, OF PITTSBURGH, PENNSYLVANIA.

DRAFT-GEAR MECHANISM.

13,894. Specification of Reissued Letters Patent. Reissued Mar. 30, 1915.

Original No. 915,272, dated March 16, 1909, Serial No. 398,729. Application for reissue filed November 30, 1914. Serial No. 874,936.

*To all whom it may concern:*

Be it known that I, DAVID F. CRAWFORD, a citizen of the United States, and resident of Pittsburgh, in the State of Pennsylvania, have invented certain new and useful Improvements in Draft-Gear Mechanisms, of which the following is a specification.

This invention has for its objects: the provision of means for supporting the draft gear on a car, said supporting means being so constructed as to extend past the car bolster and at one side thereof, and arranged for attachment to the car's center sill, whereby the buffing and pulling strains of the draft rigging will be transmitted to said center sill at a point beyond the bolster, and eliminate the tendency to breakage encountered in car structures where the draft sills or other draft supporting devices extend back to or are secured to the body bolster of the car.

This improvement is particularly applicable to cars in which the sills, whether made of wood or metal, are continuous and located above the body bolster, the bolster extending transversely underneath the sill and substantially in the plane of the draft rigging.

It is found in connection with car constructions of the character last described, especially where wooden sills are employed, that there is apparently a downward and upward strain induced by the buffing and pulling strain of the draft gear, which has its center or effective resistance upon or about the body bolster, and tends to break or split the sills at or approximately at this place. In connection with car structures of this general character it has been found by experience in practice that the addition of a better form of draft gear is not productive of the desired results in many cases, on account of the tendency of the sill to give way at the point indicated.

A further object of this invention is the provision of means whereby draft gears of larger diameter, as for example the standard Westinghouse friction draft gear and other friction draft gears can be applied in car construction built some years before the general use of devices of this character, in which the central sills are built too closely together to permit of ready introduction of the gearing, either between the center sills or between sub sills or draft sills located immediately under the center sills as in the common form of construction.

Figure 2:
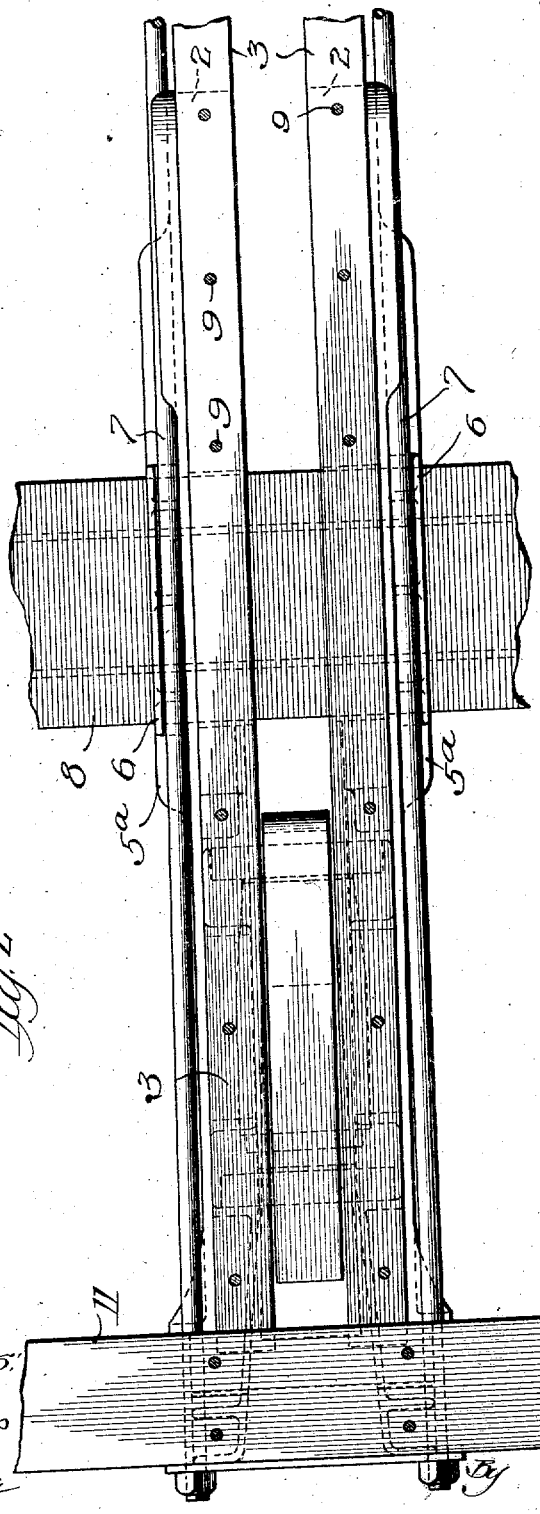

The above, as well as such other objects which may hereinafter appear, I attain by means of the construction which I have illustrated in the preferred form in the accompanying drawings, wherein, Figure 1 is a longitudinal sectional view on the line 1—1 of Fig. 2; Fig. 2 is a plan view of a portion of the car framing, showing two longitudinal center sills with my improved mechanism or draft gear supporting device applied thereto; Fig. 3 is a view in elevation of the body portion or main part of my improved device; Fig. 4 is a sectional view taken on the line 4—4 of Fig. 1; Fig. 5 is a sectional view on the line 5—5 of Fig. 1; Fig. 6 is another sectional view taken on the line 6—6 of Fig. 1, and, Fig. 7 is a sectional view on the line 7—7 of Fig. 1.

Referring now more particularly to Figs. 1 and 3, it will be seen that in carrying out my improvement, I provide first a main or body portion of the gear supporting device indicated by the reference character 1, said gear supporting device preferably being constructed of cast metal and arranged with a plate 2 (see Fig. 4), adapted for attachment on the underside of the center sill 3, by means of bolts 4, or other suitable devices. The plate or flange 2, is substantially continuous from end to end of the strengthening beam, being interrupted at the body bolster to enable the beam to be better fitted thereto. I compensate for this loss of metal by adding a flange $5^a$, on the opposite side of the vertical member, as shown in full lines in Fig. 6, and in dotted lines in Figs. 1 and 3. Further strength is added by means of the vertical webs $5^b$, which connect the truss rod saddles to the flange $5^a$. Extending above said body portion 1, of the gear supporting device, I raise a projecting or extending part 5, constructed to run along adjacent to the sill 3, on the outside thereof, as clearly indicated in the sectional views, Figs. 5, 6 and 7, and adapted for attachment to said center sill 3, by any suitable means, as for example a plurality of horizontal bolts $9^a$, and vertical bolts 9, said bolts 9, extending through the wooden sill and through the integral horizontal flange or plate 2, of the strengthening member, said extended portion 5, also being provided with a seat 6, as indicated in Fig. 6, intended for the engagement of a truss rod 7, at a point substantially above the body bolster 8.

By the use of the bolts 9, the gear supporting device is caused to strengthen the sill as by the operation of a stiffening plate, and this at the point most subject to breakage. The projection 5, extends also above the body bolster at the side of the sill as indicated, and is provided with securing bolts 9[a], thus strengthening the sills directly over the bolster. The end of the projection 5, is indicated at 10, and as shown, is preferably a substantial distance within or to the rear of the body bolster.

At the forward end or the outside end of the car the body portion of the gear supporting device indicated at 1, projects below the end sill 11, in position to receive the draft rigging shank 12, and below the gear supporting device or main body casting is a saddle bar 13, secured to the body portion by bolts as indicated, upon which saddle portion 13, the draft rigging is adapted to rest.

Referring to Fig. 4 it will be noticed that the gear supporting device at the place where the draft rigging is inserted is arranged with an offset downward projection 15, having brackets 16, for stiffening the same, so as to leave more space for the insertion of a large sized gear such as the ordinary friction gear commonly employed. Thus it will be seen by examination of Fig. 4, that the distance from the center line of the car to the inside face of the sill 3, is considerably less than the clearance space within which the friction gear, indicated by the dotted half circle 17, is located.

In order to provide a means for taking the buffing strain from the end sills direct, the upper portion of the gear supporting device is projected forward to form a shoulder indicated at 18, in Fig. 3. The construction shown in Fig. 3, as is evident from an examination of the drawings, will therefore transmit strains directly from the end sills and from the friction gear, to a point upon the center sill, beyond or inside of the bolster, and the location of the projecting part 5, at each side of the center sills and above the boltster makes it easy to replace the supporting device in case of any breakage, without disturbing either the sills of the car or the bolster itself.

Much of the sill breakage is avoided by providing the shelf which extends beneath the sill to the rear of the bolster; the strains at that point being largely in a vertical direction are applied to the sill over a large area and without shear on any fastening bolts.

The word "truss", as herein used, relates to a structure which is secured to the sill, lies alongside one of the upright faces of the sill, and extends a substantial distance to the rear of the bolster, and is connected to the gear-supporting device for draft and buffing purposes, whereby the bending strains set up by draft, buffing and load will be transmitted to the sill throughout the structure and thereby equalized in the sill portion lying above the structure. Consequently breakage of the sill over the bolster, due to the superposed load and to draft and buffing strains, is reduced to a minimum. To this end, therefore, the truss portion may be considered as that portion of the structure which lies alongside the center sill and usually projects a substantially equal distance on both sides of the body bolster. It will therefore be understood that the word "truss" is not used in its strictly technical sense, but according to the definition thereof as used in the railway art, particularly as set forth in the Master Car Builders' Dictionary of 1906, which was the authority in the car builders line at the time of the filing of applicant's original application. A truss of this definition is exhibited in the Challender truss, which is a thin plate of iron located alongside the posts in a passenger car and extends from end to end of the car, being rigidly secured to the wooden posts and serving to replace the usual truss rods used beneath such cars. A similar use of the word "truss" is found in the railway art in the description of the bunk truss for logging cars.

Having thus described my invention and illustrated its use, what I claim as new and desire to secure by Letters Patent, is the following:

1. In combination, a car having a wooden center sill and a transverse bolster, and a gear supporting device at the front of the bolster provided with a truss portion extending to the rear alongside the sill and rigidly secured to the sill for stiffening it above the bolster.

2. A draft gear supporting device provided with a rearwardly extending truss portion, and a seat thereon arranged to support a car truss rod, intermediate the ends of said rod.

3. In combination, a car having a wooden center sill and a transverse bolster, and a gear supporting device at the front of the bolster and beneath the center sill provided with a truss portion extending to the rear alongside the sill and rigidly secured to the sill for stiffening it above the bolster.

4. In combination, a car having a wooden center sill and a transverse bolster, and a gear supporting device having a truss portion adapted to extend alongside said center sill above and a substantial distance on each side of said bolster, said beam being provided with horizontal flange adapted to be secured to a sill at the rear of the body bolster, substantially as described.

5. In a railway car, the combination of wooden center sills and a transverse bolster, a gear supporting device having a truss-portion extending alongside a center sill above the bolster and a substantial distance on either side thereof, said gear supporting device having a horizontal plate 2, underlying a center sill, and a horizontal flange 5[a], projecting oppositely from said horizontal portion, substantially as described.

6. In combination, a car having a center sill and a transverse bolster, and a gear-supporting device having a truss portion extending alongside said center sill above and a substantially equal distance on each side of said bolster, said truss being of a vertical height at the bolster substantially equal to that of the sill, and also provided with a substantially horizontal flange in rear of the body bolster to underlie and to be secured to the sill.

7. The combination with a center sill, a transverse bolster, and a gear-supporting device in front of the bolster, of strain-equalizing means to prevent breakage of the sill above the bolster, said strain-equalizing means including a plate secured to the sill and lying alongside of one of the upright faces of the sill and extending across and at opposite sides of the bolster, the extension in the rear of the bolster being substantially equal to the extension in front of the bolster, said equalizing plate being provided with substantially horizontal flanges located in front and rear of the bolster respectively and underlying the sill in engagement therewith, and the gear-supporting device and the plate being connected, whereby draft and buffing strains transmitted to the sill through the plate will be equalized in the sill portion lying across the bolster.

Signed at Pittsburgh, this 19th day of November, 1914.

DAVID F. CRAWFORD.

Witnesses:
THOMAS R. COOK,
W. S. CAREY.